United States Patent [19]
Becker et al.

[11] Patent Number: 5,807,924
[45] Date of Patent: Sep. 15, 1998

[54] COATING MEDIA AND A PROCESS FOR PRODUCING MULTI-LAYER COATINGS

[75] Inventors: Heinz Dietholf Becker, Bonn; Gerhard Bremer, Frechen; Werner Stephan, Wuppertal, all of Germany

[73] Assignee: Herberts GmbH, Wuppertal, Germany

[21] Appl. No.: 743,518

[22] Filed: Nov. 4, 1996

[30] Foreign Application Priority Data

Nov. 11, 1995 [DE] Germany ............... 195 42 119.1

[51] Int. Cl.$^6$ ............ C08K 3/10; C08G 18/32; C08G 18/34; C08G 18/77
[52] U.S. Cl. ............ 524/786; 427/385.5; 524/788; 525/123; 525/130; 525/131; 528/55; 528/57; 528/60; 528/61; 528/75; 528/80; 528/81; 528/84
[58] Field of Search ............ 524/786, 788; 525/123, 130, 131; 528/55, 57, 60, 61, 75, 80, 81, 84; 427/385.5

[56] References Cited

U.S. PATENT DOCUMENTS

| 5,126,170 | 6/1992 | Zwiener et al. | 528/68 |
|---|---|---|---|
| 5,236,741 | 8/1993 | Zwiener et al. | 528/68 |
| 5,243,012 | 9/1993 | Wicks et al. | 528/58 |
| 5,290,902 | 3/1994 | Jacobs et al. | 528/49 |
| 5,322,897 | 6/1994 | Jung et al. | 525/123 |
| 5,412,056 | 5/1995 | Zwiener et al. | 528/73 |
| 5,516,873 | 5/1996 | Hicks et al. | 528/60 |
| 5,559,204 | 9/1996 | Squiller et al. | 528/84 |

FOREIGN PATENT DOCUMENTS

| 2048444 | 2/1992 | Canada . |
|---|---|---|
| 2123285 | 11/1994 | Canada . |
| 2148318 | 11/1996 | Canada . |
| 349 818 | 1/1990 | European Pat. Off. . |
| 470 461 | 7/1991 | European Pat. Off. . |
| 588 314 | 9/1993 | European Pat. Off. . |
| 630 922 | 5/1994 | European Pat. Off. . |
| 470 461 | 7/1994 | European Pat. Off. . |
| 43 16 912 | 12/1994 | Germany . |
| 43 22 242 | 1/1995 | Germany . |
| 44 15 778 | 11/1995 | Germany . |

*Primary Examiner*—Rabon Sergent
*Attorney, Agent, or Firm*—Merchant, Gould, Smith, Edell, Welter & Schmidt, P.A.

[57] ABSTRACT

This invention relates to two-component, solvent-thinnable coating media based on a polyisocyanate component and a component which reacts with isocyanate. The coating media contain one or more hydroxy-functional copolymers, one or more secondary polyamines containing ester groups, one or more aliphatic and/or cycloaliphatic polyisocyanates containing allophanate groups, extenders and/or pigments and optionally one or more organic solvents and customary lacquer additives. 60 to 75% by weight of aluminium hydroxide and calcium magnesium carbonate are contained in total, with respect to the total amount of extenders and/or pigments.

7 Claims, No Drawings

COATING MEDIA AND A PROCESS FOR PRODUCING MULTI-LAYER COATINGS

This invention relates to two-component, solvent-thinnable coating media based on a polyisocyanate component and a component which reacts with isocyanate. The coating media have a very high solids content and are employed in particular as primer-surfacer or primer coats in the coating of motor vehicles and motor vehicle parts.

Two-component coating media based on a polyhydroxyl and a polyisocyanate component have long been known. High quality coatings which have a very good resistance to chemicals and solvents and which exhibit a very high level of visual and mechanical properties are obtained from these coating media.

Efforts are being made, within the context of general environmental requirements, to keep the solvent content or the proportion of volatile organic compounds (VOC) as low as possible in solvent-containing coating media of this type, and to obtain a high solids content. This is achieved, for example, by the use of what are termed reactive thinners or by the use of specially developed low-viscosity binder vehicles.

E-A-0 470 461 describes binder vehicles for two-component automobile repair lacquers which contain polyisocyanates and a component which reacts with isocyanate. The component which reacts with isocyanate is based on a polyhydroxyl compound (OH-functional polyacrylates and/or polyesters) and a secondary diamine which contains ester groups. The latter can be prepared by the reaction of 3,3'-dimethyl-4,4'-diamino-dicyclohexylmethane with diethyl malonate or fumarate (polyaspartic acid derivative). Solids contents of 45–65% by weight are obtained in these coating media.

DE-A-43 16 912 discloses binder vehicle systems which are suitable for the production of primer-surfacer and primer coats and which are based on a polyisocyanate and a hydroxy-functional copolymer, obtainable from diesters, alpha,beta olefinically unsaturated dicarboxylic acids, aromatic vinyl hydrocarbons, alkyl and hydroxyalkyl esters of alpha, beta olefinically unsaturated monocarboxylic acids, and a nitrocellulose which is soluble in esters.

From the binder vehicle systems described above, coating media can be formulated which have a lower content of volatile organic compounds compared with conventional OH/NCO crosslinked systems and which thus have a higher solids content. The said coating media cannot be employed for special applications and fields of use, particularly in the coating of motor vehicles for repair purposes, where extremely low VOC values less than 2.1 lb/gal are required, on account of legislation for example.

The object of the present invention was therefore to provide solvent-based, isocyanate-crosslinking coating media, particularly for the production of primer and primer-surfacer coats, which have a very high solids content in their ready-to-spray condition, which can be sprayed easily, even by means of the HVLP (high volume low pressure) technique, and which result in coatings of perfect surface quality which can be rubbed down well.

This object is achieved by a coating medium containing
A) one or more hydroxy-functional copolymers which are obtainable by the reaction of
  a) 3–50% by weight of one or more glycidyl esters of aliphatic saturated monocarboxylic acids containing a tertiary or quaternary alpha-C atom and
  b) 97–50% by weight of at least two olefinically unsaturated copolymerisable monomers, at least one of which contains at least one carboxyl group and at least one of which is sterically hindered, in the presence of radical polymerisation initiators, wherein the amount of carboxyl groups in component b) exceeds the amount of glycidyl groups in component a) by an extent such that the resulting copolymer has an acid number of at least 15 mg KOH/g,
B) one or more secondary polyamines which contain ester groups and which are of general formula

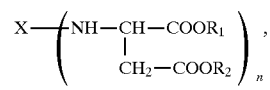

where X represents an n-valent organic radical containing 4–20C atoms, R1 and R2 represent the same or different alkyl radicals containing 1–8 C atoms and n represents an integer of at least 2,
C) one or more aliphatic and/or cycloaliphatic polyisocyanates containing allophanate groups,
D) extenders and/or pigments, wherein 60–75% by weight of aluminium hydroxide (Al(OH)$_3$) and calcium magnesium carbonate (CaMg(CO$_3$)$_2$) is contained in total, based on the total amount of extenders and/or pigments, and
E) optionally one or more organic solvents and customary lacquer additives, wherein polyisocyanate component C) is present in a quantitative proportion such that 0.5 to 2 isocyanate groups are allotted to one group containing active hydrogen.

Component A) and component B) are preferably present in a ratio by weight of 8:1 to 1:2, most preferably of 6:1 to 1:1, with respect to the solid resin.

A very high solids content, preferably of 80–88% by weight, is obtained in the coating media according to the invention. In this connection, the solids content is understood to mean the stoving residue, i.e. the sum of the non-volatile constituents which remain in the coating after stoving. Despite their extremely high solids content the coating media can be sprayed well, even by means of the HVLP technique, and the coatings exhibit a perfect, pore-free surface.

Component A) comprises copolymers with an acid number greater than 15, preferably of 18–50, most preferably of 21–35 mg KOH/g, an OH number of 40–250, preferably of 70–200, most preferably of 80–180 mg KOH/g, and a solution viscosity of 10 to 2000, preferably of 15–500, most preferably of 20–150 mPa.s (measured on a 50% solution at 23° C. according to DIN 53 018). The copolymers have average molecular weights (number average) of less than 5000, preferably of 300–4500, most preferably of 500–4000 g/mole.

6–30% by weight of component a) and 70–94% by weight of component b) are preferably used.

Glycidyl esters of alpha-alkyl alkanecarboxylic acids and/or alpha,alpha,dialkyl-alkanecarboxylic acids are preferably used, individually or in admixture, as component a). These are preferably the glycidyl esters of C4–C30 monocarboxylic acids, most preferably the glycidyl esters of C5–C20 monocarboxylic acids.

Examples thereof include the glycidyl esters of 2,2-methylpropionic acid, 2,2-dimethylundecanoic acid and of neo acids such as neohexanoic acid, neononanoic acid and neodecanoic acid. The alkyl radicals here may also contain a different number of C atoms.

Component b) consists of a mixture of
b1) one or more olefinically unsaturated monomers containing at least one carboxyl group, and b2) one or more olefinically unsaturated, sterically hindered monomers, and optionally one or more of components b3) to b5), b3) one or more hydroxyalkyl esters, hydroxyaryl esters or oligomeric hydroxyalkylene glycol esters of unsaturated carboxylic acids, b4) one or more esters of an unsaturated carboxylic acid with a monohydric alcohol containing 1 to 20 C atoms, and b5) one or more olefinically unsaturated compounds which are not covered by b1), b2), b3) or b4).

Examples of monomers b1) include acrylic acid, methacrylic acid, maleic, fumaric and itaconic acids and semi-esters thereof, crotonic acid, isocrotonic acid and vinylacetic acid. (Meth)acrylic acid, maleic acid and fumaric acid are preferred.

Monomers b2) are olefinically unsaturated, sterically hindered monomers, the homopolymers of which have glass transition temperatures above 45° C., as measured at a sufficiently high molecular weight at which a dependency of the glass transition temperature on the molecular weight no longer exists. Unsaturated, sterically hindered monomers are to be understood as compounds containing at least one C—C double bond as well as a branched carbon chain and/or a mono- or polycyclic structure.

Suitable monomers b2) comprise esters of olefinically alpha,beta-unsaturated carboxylic acids, such as acrylic acids and methacrylic acid, with sterically hindered alcohols, and also comprise sterically hindered vinyl monomers. Examples of suitable sterically hindered alcohols include saturated alcohols containing 4–20 C atoms, such as tert.-butyl alcohol, tert.-amyl alcohol, 2,3-dimethyl-2-butanol, neopentyl alcohol and 3-pentanol, as well as cyclic aliphatic alcohols containing 6–20 C atoms, such as cyclohexanol, 4-tert.-butyl cyclohexanol, 3,3,3-trimethylcyclohexanol and isoborneol, for example.

Examples of suitable sterically hindered vinyl monomers include styrene, 4-phenylstyrene, vinylcyclohexane, tert.-butylstyrene and alpha-methylstyrene.

The preferred monomers b2) are tert.-butyl, cyclohexyl, 4-tert.-butylcyclohexyl and isobornyl esters of (meth)acrylic acid.

Hydroxyalkyl esters b3) are esters of unsaturated monocarboxylic acids with aliphatic diols which preferably contain 2–20 C atoms. Examples thereof include hydroxyethyl (meth)acrylate, hydroxypropyl (meth)acrylate, hydroxybutyl (meth)acrylate, hydroxyhexyl (meth)acrylate, 2-hydroxypropyl (meth)acrylate and 2-hydroxybutyl (meth)acrylate. The reaction products of one mole of hydroxyethyl (meth)acrylate and 2 moles of epsilon-caprolactone are also suitable.

Examples of unsaturated monomers b4) include esters of unsaturated monocarboxylic acids with aliphatic monohydric alcohols containing 1–20 C atoms, such as methyl (meth)acrylate, ethyl (meth)acrylate or butyl(meth)acrylate.

Examples of unsaturated monomers b5) include vinyl esters such as vinyl acetate, and monomers which contain silane groups, such as (meth)acryloxypropyltrimethoxysilane and (meth)acryloxypropyl-tris(2-methoxyethoxy)silane.

The usual radical-forming polymerisation initiators are suitable, individually or in admixture, for the production of copolymers A). Examples thereof include aliphatic azo compounds, diacyl peroxides, and preferably dialkyl peroxides.

The polymerisation is preferably conducted as a bulk polymerisation.

Examples of suitable solvents for the polymers obtained in this manner include aromatic hydrocarbons such as xylene or toluene, esters such as ethyl acetate, butyl acetate or butyl propionate, glycols, alcohols, or ketones such as methyl isobutyl ketone.

Component B) comprises compounds of general formula

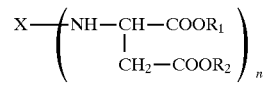

where X, $R_1$ and $R_2$ have the meaning given above.

"Polyaspartic acid derivatives" such as these are particularly preferred in which X represents a divalent hydrocarbon radical, as are obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexylmethane or 3,3'- dimethyl-4,4'-diaminodicyclohexylmethane and in which n=2. The preferred R1 and R2 radicals are methyl or ethyl radicals.

Component B) can be prepared in the manner known in the art, by the reaction of the corresponding primary polyamine of formula X-(—NH$_2$), with maleic or fumaric acid esters of general formula $R_1OOC-CH=CH-COOR_2$. Examples of suitable maleic or fumaric acid esters include dimethyl malonate, diethyl malonate, di-n-butyl malonate and the corresponding fumaric acid esters; n is preferably 2 here.

"Polyaspartic acid derivatives" of this type and the preparation thereof are described in EP-A-0 470 461, for example.

Mixtures of different components B) may be present.

Polyisocyanate component C) comprises (cyclo)aliphatic polyisocyanates which contain allophanate groups. The term "(cyclo)aliphatic" is to be understood here and in what follows to represent aliphatic and/or cycloaliphatic.

The polyisocyanates preferably contain isocyanurate groups in addition. The polyisocyanates which contain allophanate groups are produced by reacting part of the isocyanate groups of a (cyclo)aliphatic diisocyanate (preferably of a molecular weight range of 140–400) with monohydric alcohols containing 1–5 C atoms in their molecule with the formation of allophanate. The preferred polyisocyanates which contain allophanate groups and isocyanurate groups are produced by forming isocyanurate groups by the catalytic trimerisation of part of the isocyanate groups of (cyclo) aliphatic diisocyanates, and by the reaction, before, during and/or after the trimerisation reaction, of a further part of the isocyanate groups with monohydric alcohols containing 1–5 C atoms in their molecule, with the formation of allophanate. The formation of allophanate and the formation of isocyanurate are preferably effected at reaction temperatures of 50°–150° C., most preferably 90°–120° C.

Suitable (cyclo)aliphatic diisocyanates which can be used as starting components for producing the polyisocyanates which contain allophanate groups are organic diisocyanates of general formula R(NCO)$_2$, where R preferably constitutes a (cyclo)aliphatic hydrocarbon group containing 4–15 C atoms. Examples of polyisocyanates of this type include 1,4-tetramethylene diisocyanate, 1,6-hexamethylene diisocyanate, 1,12-dodecamethyl diisocyanate, 2,2,4-trimethyl-1,6-hexamethylene diisocyanate, cyclohexane 1,3- and 1,4-diisocyanate, isophorone diisocyanate, bis-(4-isocyanatocyclohexyl)-methane, bis-(4-isocyanato-3-methylcyclohexyl)-methane, 1,3- and 1,4-bis (isocyanatomethyl)-cyclohexane, and 1,3- and 1,4-tetramethylxylylene diisocyanate. 1,6-hexamethylene diisocyanate, isophorone diisocyanate and bis-(4-isocyanatocyclohexyl)-methane are preferred. The diisocyanates may also be used in admixture.

Examples of monohydric alcohols containing 1–5 C atoms in their molecule which can be used, and which may optionally also contain ether oxygen atoms, include methanol, ethanol, n-propanol, iso-propanol, n-butanol, isobutanol, tert.-butanol, n-pentanol, 2-pentanol, 3-pentanol, isomeric methyl butyl alcohols, ethoxymethanol and methoxymethanol. The preferred alcohols are ethanol, n-propanol, iso-propanol and isomeric butanols.

Polyisocyanates of this type which are suitable as component C), as well as the production thereof, are expressly described in EP-A-0 496 208 and EP-A-0 649 866, for example.

It is not preferred, but it is also possible, for the polyisocyanates which contain allophanate groups to be present in admixture with other customary lacquer polyisocyanates.

The coating media according to the invention contain pigments and/or extenders. In this respect it is essential to the invention that 60–75% by weight of aluminium hydroxide and calcium magnesium carbonate in total, with respect to the total amount of extenders and/or pigments, is contained in the coating medium. 65–70% by weight of aluminium hydroxide and calcium magnesium carbonate should preferably be contained. Aluminium hydroxide and calcium magnesium carbonate are preferably present in a ratio by weight of 1:3 to 3:1, most preferably in a ratio by weight of 1:1.5 to 1.5:1.

The aluminium hydroxide may comprise aluminium hydroxides which are commercially available in powder form, for example. The calcium magnesium carbonate may comprise natural calcium carbonates (dolomite) which are commercially available in powder form.

The coating media according to the invention additionally contain one or more further pigments and/or extenders. All customary lacquer pigments of an organic or inorganic nature are suitable as pigments. The pigments may be colouring pigments and/or anti-corrosion pigments. Examples of inorganic or organic pigments include titanium dioxide, micronised titanium dioxide, iron oxide pigments, carbon black, azo pigments, phthalocyanine pigments, and quinacridone or pyrrolopyrrole pigments. Zinc phosphate is an example of an anti-corrosion pigment. Examples of other extenders which may be contained in the coating medium in addition to aluminium hydroxide and calcium magnesium carbonate include hydrated silica, aluminium silicate, magnesium silicate, calcium carbonate, barium sulphate, kaolin and french chalk.

The ratio by weight of extenders and/or pigments to binder vehicles (based on solids to solids) is preferably 70 to 80 to 30 to 20.

The coating media according to the invention may contain organic solvents. Examples of suitable organic solvents include: glycol ethers such as ethylene glycol dimethyl ether or propylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; ketones such as methyl ethyl ketone, methyl isobutyl ketone, cyclohexanone or isophorone; aromatic hydrocarbons (e.g. with a boiling range of 136°–180° C.) and aliphatic hydrocarbons.

In addition, the coating media according to the invention may contain customary lacquer additives. Examples of these include levelling agents based on (meth)acrylic homopolymers or silicone oils, rheology influencing agents such as pyrogenic silica or hydrogenated castor oil, and hardening accelerators for the crosslinking reaction with the polyisocyanates and wetting agents. The additives are employed in the usual amounts familiar to one skilled in the art.

In order to produce the coating media according to the invention, the individual constituents are mixed with each other and are homogenised or ground in the usual manner.

The coating media according to the invention are two-component coating media, i.e. components A) and B) which react with isocyanates, and polyisocyanate component C) have to be stored separately from each other.

Shortly before application, components A) and B), which react with isocyanates, and component D), optionally with solvents and customary lacquer additives, are thoroughly mixed with polyisocyanate component C). The mixture can thereafter be adjusted to spraying viscosity with organic solvents.

The coating media produced in this manner are particularly suitable for the production of primer-surfacer and/or primer coats of an air-drying or forced-drying multi-layer coating. However, they may also be hardened at higher temperatures of 80°–140° C. for example. They are suitable for the coating of vehicles and for industrial coating, and are particularly suitable for the coating of vehicles and vehicle parts for repair purposes.

The coating media are applied by known methods, such as spraying, dipping, rolling or by doctor blade application. They may be applied, as such or on customary primer coats, to a substrate which is optionally pretreated. They adhere well to very different substrates, such as bare steel sheet, rubbed down polyvinyl butyral primer, two-component epoxide primers, or rubbed down shop or old coatings. After drying and rubbing down, the coating media according to the invention can be overcoated without problems with the usual covering lacquers. The latter may comprise single-coat covering lacquers, e.g. those with a two-component acrylate/isocyanate basis, or may comprise customary base coat/clear coat structures. They can be overcoated with solvent-based or water-thinnable coating media.

The coating media according to the invention can be dried at room temperature or for 30–50 minutes at 60° C. after a ventilation period of 5–15 minutes, for example.

The present invention also relates to a process for producing multi-layer coatings and to the use of the coating media for the production of multi-layer coatings, wherein in particular the primer-surfacer and/or primer coats of multi-layer coatings are replaced by the coating media according to the invention.

The coating media according to the illustrated have a very high solids content (80–88% by weight) in their ready-to-spray condition and have a good spraying capacity. Pore-free surfaces are even obtained using the HVLP spray technique. VOC values of 2.1 lb/gal and below are obtained with the coating media according to the invention. Coatings are obtained which exhibit excellent non-sag properties, good body, good rubbing down capacity and a reduced tendency to form edge marks. A very good lacquer condition is ensured on overcoating.

The invention is explained in more detail with reference to the following examples. All data are based on weight.

EXAMPLE 1

Production of a copolymer A) 24.18 parts of a glycidyl ester of an alpha,alpha-dialkylalkane-monocarboxylic acid (Cardura E 10, Shell Chemicals) (partly in solvent) were placed in a reactor fitted with a stirrer, an inert gas line, a heating and cooling system and an addition device, and were heated under inert gas to 170° C. A monomer mixture comprising 3.54 parts acrylic acid, 7.69 parts methacrylic acid, 19.85 parts hydroxyethyl methacrylate, 14.89 parts isobornyl methacrylate, 7.18 parts methyl methacrylate and 22.67 parts styrene (partly in solvent) was then steadily metered in over 6 hours, together with 1.5 parts of an initiator (di-tert.-amyl peroxide). The mixture was polymerised for a further 2 hours until a conversion of at least 95% was obtained. After distilling of the residual monomers a solids content of 98.4% was obtained. The copolymer was then dissolved in butyl acetate. This resulted in a solids content of 70.1%. The acid number of the copolymer was 22.3 mg KOH/g solid resin, the hydroxyl number was 134.8 mg KOH/g solid resin, and the viscosity was 51 mPa.s (50% in butyl acetate, 23° C.).

EXAMPLE 2

Production of a primer-surfacer

Production of the main component: 18 parts of a copolymer solution corresponding Example 1, 4.5 parts of a commercially available aspartic acid derivative (Desmophen VP LS 2973, a commercial product supplied by Bayer), 4 parts of a solvent mixture comprising butyl glycol acetate and methoxypropyl acetate, and 0.6 parts of a commercially available wetting agent, were placed in a clean, dry vessel and thoroughly mixed. 0.3 parts of a commercially available thixotropic agent, 1.9 parts of a commercially available levelling agent, 1.5 parts of iron oxide pigments, 5 parts titanium dioxide, 7.2 parts of an anti-corrosion pigment, 28 parts of a commercially available aluminium hydroxide (Apyral 15) and 29 parts of a commercially available calcium magnesium carbonate (Microdol 1) were then added and were dispersed with a customary dispersing device.

Preparation of the hardener component 38 parts butyl acetate, 1.5 parts of a commercially available dibutyltin dilaurate solution and 60.5 parts of a commercially available polyisocyanate containing allophanate groups (Desmodur VP LS 2102, a commercial product supplied by Bayer) were well mixed with each other.

Shortly before application, the main component and the polyisocyanate hardener were mixed with each other in a ratio by volume of 3:1. For this operation, the main component was placed in a vessel and the polyisocyanate hardener was added and stirred thoroughly.

After adding the hardener the primer-surfacer was ready for spraying. A solids content of 85% by weight was obtained in the ready-to-spray condition.

Application of the primer-surfacer

The coating media obtained in this manner was applied by spray application, in one to two spray passes, to cleaned, rubbed-down steel sheets primed with wash primer, to give dry coat thicknesses of 80–200 µm, and was dried at room temperature. Pore-free coatings were produced. The coatings could be rubbed down after drying overnight at room temperature. The coatings exhibited good non-sag properties and very good body.

After overcoating with either a solvent-based base lacquer and a solvent-based two-component clear lacquer, or with an aqueous base lacquer and a solvent-based two-component covering lacquer, or after overcoating with a solvent-based two-component covering lacquer, results were obtained in the salt spray test (DIN 53162), in the temperature and humidity test (DIN 50017) and in the VDA test (621–415) which satisfied the most severe demands made on an automobile repair lacquer structure.

We claim:

1. A two-component, solvent-thinnable coating medium comprising:

A) one or more hydroxy-functional copolymers which are the free radical polymerization product of
  a) 3–50% by weight relative to the total weight of A) of one or more glycidal esters of aliphatic saturated monocarboxylic acids containing a tertiary or quaternary alpha-C atom and
  b) 97–50% by weight relative to the total weight of A, of at least two olefinically unsaturated copolymerisable monomers, at least one of which monomers contains at least one carboxyl group and at least one of which monomers is sterically hindered, wherein the amount of carboxyl groups in component b) exceeds the amount of glycidal groups in component a) by an extent such that the resulting copolymer has an acid number of at least 15 mg KOH/g, B) one or more secondary polyamines which contain ester groups and which are of general formula

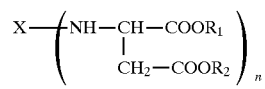

where X represents an n-valent organic radical containing 4–20 C atoms, R1 and R2 represent the same or different alkyl radicals containing 1–8 C atoms and n represents an integer of at least 2, C) one or more aliphatic and/or cycloaliphatic polyisocyanates containing allophanate groups, D) extenders or pigments, or a combination thereof, wherein 60–75% by weight of the extenders pigments or combination thereof is aluminum hydroxide (Al(OH)$_3$) and calcium magnesium carbonate (CaMg(CO$_3$)$_2$), with the weight ratio of aluminum hydroxide to calcium magnesium carbonate being from about 1:3 to about 3:1, and E) one or more organic solvents wherein polyisocyanate component C) is present in a quantitative proportion such that there are 0.5 to 2 isocyanate groups per group containing active hydrogen.

2. A coating medium according to claim 1, wherein component A) and component B) are present in a ratio by weight of 8:1 to 1:2.

3. A coating medium according to claim 1 wherein the non-volatile constituents in the coating medium provide a solids content of 80 to 88% by weight, relative to the total weight of the coating medium.

4. A coating medium according to claim 1, wherein copolymer A) has a number average molecular weight of less than 5000 g/mole, an acid number greater than 15 mg KOH/g, an OH number of 40 to 250 mg KOH/g, and a solution viscosity according to DIN 53 018 of 10 to 2000 mPa.s.

5. A coating medium according to claim 1, wherein in the general formula of component B), n=2 and R1 and R2 represent, independently of each other, a methyl or ethyl radical.

6. A process for producing a multi-layer coating by the application of at least two coating layers to a substrate, comprising applying a coating medium according to claim 1 as a primer-surfacer or primer coat.

7. A coating medium according to claim 1 further comprising one or more lacquer additives.

* * * * *